No. 862,168. PATENTED AUG. 6, 1907.
H. D. JAMES.
SYSTEM OF CONTROL FOR ELECTRIC MOTORS.
APPLICATION FILED NOV. 13, 1905.
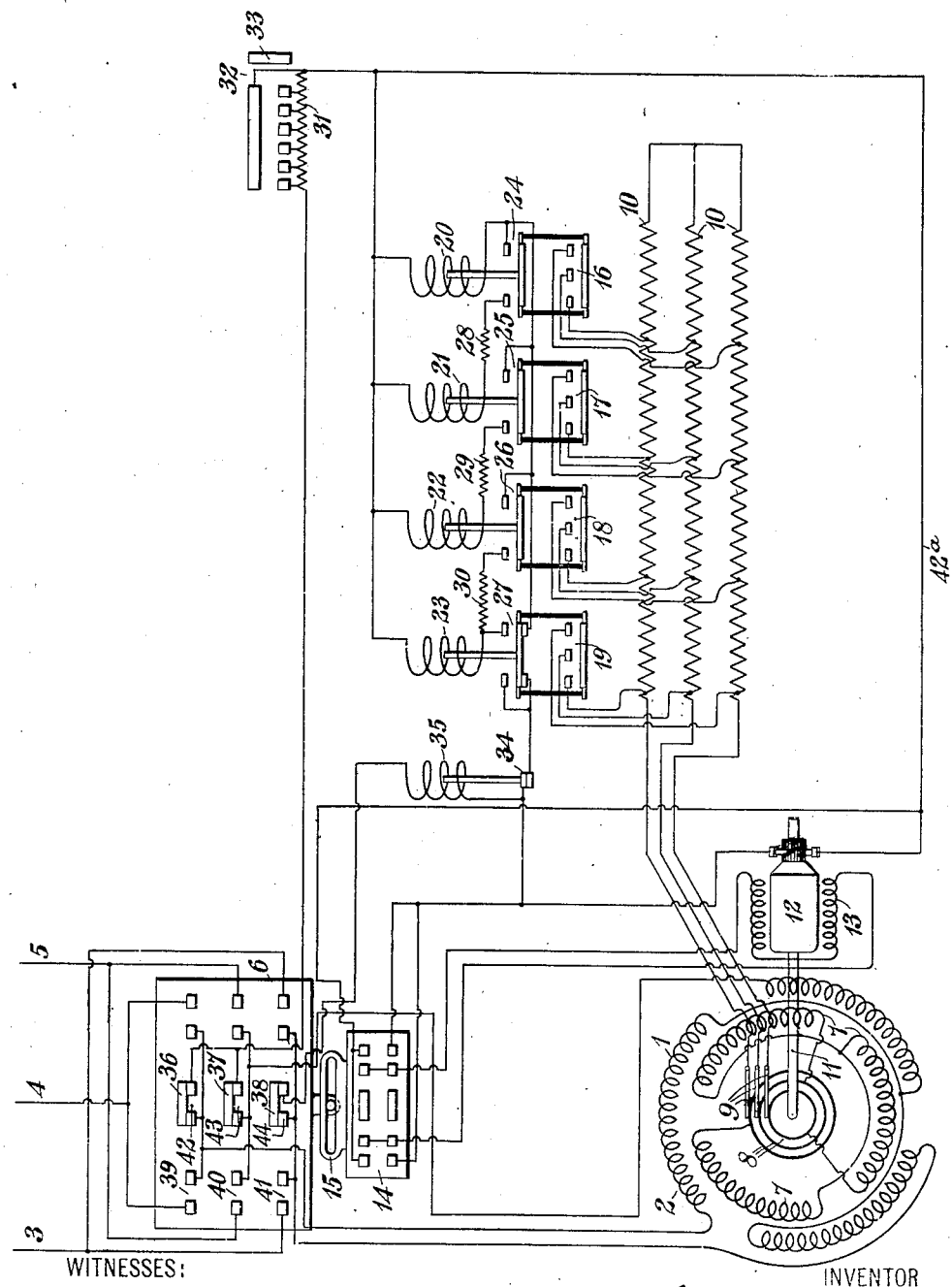
WITNESSES:
C. L. Belcher
Otto S. Schairer
INVENTOR
Henry D. James
BY Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL FOR ELECTRIC MOTORS.

No. 862,168.　　　　Specification of Letters Patent.　　　　Patented Aug. 6, 1907.

Application filed November 13, 1905. Serial No. 287,049.

*To all whom it may concern:*

Be it known that I, HENRY D. JAMES, a citizen of the United States, and a resident of Pittsburg, in the county of Allegheny and State of Pennsylvania, have invented a new and useful Improvement in Systems of Control for Electric Motors, of which the following is a specification.

My invention relates to systems of control for electric motors, and particularly to such as are employed in the control of motors of the alternating current induction type.

The object of my invention is to provide improved means whereby resistance may be gradually and automatically removed from the secondary circuit of an induction motor as the speed thereof increases.

A further object is to provide a convenient and novel means for braking the motor after it is disconnected from the supply circuit.

Induction motors having resistances suitably arranged in the secondary circuit are sometimes provided with mechanical devices which automatically cut out the resistances when the motors attain certain predetermined speeds. In starting a very large motor, however, it is impracticable and objectionable to remove all of the resistance from the circuit at one time.

According to my invention, the resistance may be removed gradually and automatically as the speed of the motor increases, the specific means which I employ comprising a comparatively small direct current dynamo-electric machine that is mounted upon, or otherwise operatively connected to, the shaft of the induction motor and a plurality of electrically controlled switches for inserting and removing the resistance from the secondary circuit, said switches being supplied with energy from the auxiliary dynamo-electric machine and being operated consecutively as the electromotive force of the auxiliary generator rises. The auxiliary generator may be utilized also for braking purposes by directing the current therefrom through the primary winding of the motor when it is not connected with the distributing circuit. I am thus enabled to vary the rate of braking by varying the amount of resistance in the auxiliary circuit.

The single figure of the accompanying drawing illustrates, diagrammatically, a system embodying my invention.

The primary winding 1 of an induction motor 2 is supplied with energy from distributing conductors 3, 4 and 5 and the circuits of the primary winding are arranged respectively for forward and reverse rotation by means of a switch 6. The terminals of the various portions of the secondary winding 7 of the induction motor are connected to slip rings 8 which are engaged by brushes 9 that are connected with external resistances 10.

The secondary winding is carried by a member which is rotatably supported by a shaft 11 upon which an auxiliary direct current generator 12 is also mounted, or to which it may be operatively connected in any other suitable manner, the generator 12 preferably being small, as compared with the induction motor.

The circuit of field magnet winding 13 of the auxiliary generator 12 is controlled by means of a switch 14 which is operated by reversing switch 6 through a lost-motion connection 15 which is so arranged that when the reversing switch 6 occupies either its extreme right or its extreme left position, the field switch 14 is also caused to occupy corresponding extreme positions. After the field switch 14 has once been moved to its extreme position, the reversing switch 6 may be returned to its mid or "off" position and again moved to the same extreme position without operating the field switch 14, but if moved in the opposite direction, the field switch will also be operated.

A plurality of switches 16, 17, 18 and 19, respectively, are provided for the purpose of governing the amounts of resistances 10 that are included in the circuit of the secondary winding 7 of the induction motor, these switches being provided respectively with operating or controlling magnet windings 20, 21, 22 and 23, which are adapted to be supplied with energy from the auxiliary direct current generator 12. The switches 16, 17 and 18 are also provided with interlocking switches 24, 25 and 26 that are located in the circuits of the magnet windings 21, 22 and 23, respectively, and that cause the main switches to close consecutively. An interlocking switch 27 that is operated by switch 19 serves to remove the magnet windings 20, 21 and 22 from the circuit after the switch 23 is closed and all of the resistances 10 have thereby been removed from the secondary circuit of the motor. Resistances 28, 29 and 30, which differ progressively in value, are connected in series with magnet windings 21, 22 and 23, respectively, this being a convenient means for causing the switches 17, 18 and 19 to be operated successively as the electromotive force of the auxiliary generator 12 rises. Any other suitable means may be provided for causing these switches to operate at different electromotive forces, such, for instance, as differences in the widths of the air-gaps between the stationary and movable portions of the magnet cores.

The circuits of the various portions of the primary winding of the induction motor are so arranged that when the reversing switch 6 occupies its mid or "off" position, direct current may be supplied thereto from the auxiliary generator 12 through a braking resistance 31, the amount of resistance included in the circuit being governed by means of a switch 32. When movable member 33 of the switch 32 occupies its extreme right position, all of resistance 31 is included in the circuit and the amount thereof will be decreased as the member 33 is moved toward the left.

If the system is applied to the operation of hoists and similar mechanisms, all or nearly all of the resistance will be included in the braking circuit when lowering at a high speed and its amount will be decreased according to the desired rate of braking.

While the generator 12 supplies current for braking purposes, it is desirable that the circuits of the magnet windings 20 to 23, inclusive, be interrupted, and for that reason, I provide a switch 34 having an operating or controlling magnet winding that is energized while the reversing switch 6 occupies its "off" position and the auxiliary generator continues to rotate.

In the operation of the system, the reversing switch 6 is first moved to one of its extreme positions, such as to the left, so as to bring conducting segments 36, 37 and 38 respectively into engagement with the corresponding pairs of contact terminals 39, 40 and 41, thereby enabling current to flow from the distributing conductors 3, 4 and 5 directly to the various portions of the primary winding of the induction motor. The switches 16 to 19, inclusive, at first occupy their lowermost positions and all of the resistances 10 are included in the secondary circuit of the motor.

The field switch 14 is operated simultaneously with the reversing switch 6, so that, as the secondary member of the motor increases in speed of rotation, direct current may be supplied from the generator 12, through conductor 42ª, magnet winding 20, interlocking switch 27 in its lowermost position and switch 34. Energizing of the magnet winding 20 causes the switch 16 to close and to short-circuit portions of the resistances 10, and it also effects closure of the interlocking switch 24, whereby the magnet winding 21 of the next switch 17 is included in the circuit. As the electromotive force of the auxiliary generator 12 rises, a sufficient amount of current is caused to traverse the resistance 28 and the winding 21 to cause operation of the switch 17. Closure of the switch 17 removes other portions of the resistances 10 from the secondary circuit of the motor and closes the interlocking switch 25 so as to include magnet winding 22 in circuit with the auxiliary generator 12. The electromotive force at which the switch 18 is closed is greater than that at which the switch 17 was closed, it being determined by the amount of the resistance 29. The switch 19 is operated in a manner similar to that just described for the switches 17 and 18. When the interlocking switch 27 is raised to its uppermost position, the circuits of the windings 20, 21 and 22 are interrupted and only the switch 19 remains closed, all of the resistances 10 being then short-circuited.

It will be readily understood that if the reversing switch 6 is moved to the right instead of to the left, as just described, the circuits will be established in a manner similar in all respects to that just described, except that the direction in which the current traverses one leg of the primary winding will be reversed in order to reverse the direction of rotation of the motor. It will also be understood that if the direction of rotation of the auxiliary generator 12 is reversed, it is necessary, or at least very desirable, to change the connections of the field magnet winding so that the direction of current flow through this winding will not be altered, this being accomplished, in the present instance, by the switch 14.

When the reversing switch 6 occupies its "off" position, the conducting segments 36, 37 and 38 electrically connect the corresponding pairs of terminals 42, 43 and 44 and thereby establish a circuit through the auxiliary generator 12, conductor 42ª, braking resistance 31, conducting segments 36 and 37, pairs of terminals 42 and 43, primary winding 1 of the induction motor, conducting segment 38 and magnet winding 35. The switch 34 is caused to open by the energizing of the magnet winding 35 and it is maintained in open position thereby so long as the auxiliary generator continues to supply current for braking purposes, the opening of the switch 34 serving to interrupt the circuits of the magnet windings 21 to 23, inclusive. The rate of braking may be varied, as before described, by varying the amount of the resistance 31 included in the circuit of the auxiliary generator.

It will be readily understood that, if desired, the circuits of a direct current motor may be governed in a manner similar to that here shown by means of switches that are supplied with energy from an auxiliary generator which is operated by means of the motor. The reversing switch 6 and the braking switch 32 may be operated manually, as here shown, or by any other suitable means that may be governed electrically or otherwise from a distance. The rate of braking may be governed by any suitable means other than the switch 23, such as a plurality of individually operated switches which may be controlled manually, or automatically according to the speed of the motor when it is desired to have the rate of braking beyond the control of the operator. For instance, when the current supply to the induction motor is interrupted and it is operating at a comparatively slow speed, it is only necessary to include a small amount of resistance in the circuit of the auxiliary generator to effect a reasonable rate of braking. If, when the current supply is interrupted, the motor is operating at a higher speed, it is obviously necessary that more resistence be included in the circuit of the auxiliary generator in order that the braking may not occur too violently.

Other modifications of the devices and the arrangements thereof in the circuits may obviously be made without departing from the scope of the invention.

I claim as my invention:

1. The combination with an alternating current motor having primary and secondary windings, a resistance in circuit with the secondary winding and means for removing the resistance from the circuit, of a generator that is operated by the motor to supply energy for controlling the operation of the resistance-removing means, a braking resistance, and means for closing the circuit of the auxiliary generator through the braking resistance and the primary winding of the motor.

2. The combination with an alternating current motor having primary and secondary windings, a resistance in circuit with the secondary winding and means for removing the resistance from the circuit, of a generator that is operated by the motor to supply energy for controlling the operation of the resistance-removing means, a braking resistance, means for closing the circuit of the auxiliary generator through the braking resistance and the primary winding of the motor, and means for varying the amount of the braking resistance in the circuit.

3. The combination with an alternating current motor having primary and secondary windings and a resistance in circuit with the secondary winding, of switches for removing the resistance from the circuit, controlling magnet windings therefor, an auxiliary generator that is operated by the motor to supply energy to the switch-controlling magnet windings, a braking resistance and means for closing the circuit of the auxiliary generator through the braking resistance and the primary winding of the motor.

4. The combination with an alternating current motor having primary and secondary windings and a resistance in circuit with the secondary winding, of switches for removing the resistance from the circuit, controlling magnet windings therefor, an auxiliary generator that is operated by the motor to supply energy to the switch controlling magnet windings, a braking resistance, means for closing the circuit of the auxiliary generator through the braking resistance and the primary winding of the motor, and means for preventing energizing of the switch-controlling magnet windings when the circuit of the auxiliary generator is established for braking purposes.

5. The combination with an alternating current motor having primary and secondary windings and a resistance in circuit with the secondary windings, of switches for removing the resistance from the circuit, controlling magnet windings therefor, an auxiliary generator that is operated by the motor to supply energy to the switch controlling magnet windings, a braking resistance, means for closing the circuit of the auxiliary generator through the braking resistance and the primary winding of the motor, and a switch for opening the circuits of the switch-controlling magnet windings when the circuit of the auxiliary generator is established for braking purposes.

6. The combination with an alternating current motor having primary and secondary windings and a resistance in circuit with the secondary winding, of switches for removing the resistance from the circuit, controlling magnet windings therefor, an auxiliary generator that is operated by the motor to supply energy to the switch controlling magnet windings, a braking resistance, means for closing the circuit of the auxiliary generator through the braking resistance and the primary winding of the motor, and a switch that is interposed in the circuit of the auxiliary generator to open the circuit of the switch-controlling magnet windings when the circuit of the auxiliary generator is established for braking purposes.

In testimony whereof, I have hereunto subscribed my name this 9th day of November, 1905.

HENRY D. JAMES.

Witnesses:
EDWIN LEHR,
BIRNEY HINES.